United States Patent [19]

Nagamune et al.

[11] Patent Number: 5,329,467
[45] Date of Patent: * Jul. 12, 1994

[54] DISTANCE MEASURING METHOD AND APPARATUS THEREFOR

[75] Inventors: Akio Nagamune; Kouichi Tezuka; Isamu Komine, all of Tokyo, Japan

[73] Assignee: NKK Corporation, Tokyo, Japan

[*] Notice: The portion of the term of this patent subsequent to Sep. 15, 2009 has been disclaimed.

[21] Appl. No.: 676,080

[22] Filed: Mar. 27, 1991

[30] Foreign Application Priority Data

Mar. 30, 1990 [JP] Japan .................................. 2-81311
Mar. 30, 1990 [JP] Japan .................................. 2-81312

[51] Int. Cl.$^5$ ............................................. G01B 11/14
[52] U.S. Cl. .................................... 364/561; 356/379; 356/380; 364/564
[58] Field of Search .................... 342/137, 145; 356/5, 356/379, 380; 364/561, 564

[56] References Cited

U.S. PATENT DOCUMENTS

| | | | |
|---|---|---|---|
| 2,443,624 | 6/1948 | Levell et al. | 364/561 |
| 3,259,022 | 7/1966 | Vietorisz | 364/561 X |
| 3,521,956 | 7/1970 | Froome et al. | 356/5 |
| 3,825,340 | 7/1974 | Debart | 356/5 |
| 4,044,356 | 8/1977 | Fournier | 342/189 |
| 4,357,610 | 11/1982 | Kingston et al. | 342/145 X |
| 4,442,513 | 4/1984 | Mead | 367/100 |
| 4,933,916 | 6/1990 | May et al. | 367/125 |
| 5,148,177 | 9/1992 | Nagamune et al. | 342/124 |
| 5,175,553 | 12/1992 | Le Garrec | 342/145 |
| 5,194,906 | 3/1993 | Kimura et al. | 356/5 |
| 5,210,587 | 5/1993 | Ohmamyuda et al. | 356/5 |

FOREIGN PATENT DOCUMENTS

| | | |
|---|---|---|
| 0362992 | 4/1990 | European Pat. Off. . |
| 2605798 | 11/1980 | Fed. Rep. of Germany . |
| 58-76784 | 5/1983 | Japan . |
| 58-166281 | 10/1983 | Japan . |
| 62-75363 | 4/1987 | Japan . |
| 1585054 | 2/1981 | United Kingdom . |

Primary Examiner—Edward R. Cosimano
Attorney, Agent, or Firm—Michael N. Meller

[57] ABSTRACT

A distance measuring method and an apparatus therefor, in which used are first and second pseudo random signals which are equal to each other in pattern but slight different from each other in frequency. A first time-series pattern obtained by multiplying the first pseudo random signal by the second pseudo random signal is generated, laser light intensity-modulated with the first pseudo random signal is radiated to a target, the light reflected from the target is received, and a intensity change of the received reflected-light is converted into an electric signal. A second time-series pattern is obtained by multiplying the electric signal as a reception signal with the second pseudo random signal. The distance to the target is measured by calculating the time difference between the first and second time-series patterns.

7 Claims, 12 Drawing Sheets

DISTANCE MEASURING METHOD AND APPARATUS THEREFOR

BACKGROUND OF THE INVENTION

The present invention relates to a laser distance measuring method for measuring the distance to a target by using laser light, and relates to an apparatus therefor. In particular, it relates to distance measurement using laser light modulated with a pseudo random signal.

The method of this type for measuring the absolute distance to a target by using laser light has been widely applied to the distance measurement in the field of civil engineering and construction industry. Some Examples are the distance measurement for the prevention of collision with moving substances, the distance measurement as visual information for remote control of robots, the distance measurement for examining the degree of damage or fatigue of refractories in the inside of a convertor or a pouring ladle used in an iron-manufacturing process, etc.

The distance measuring methods using laser light are generally classified into three, namely, a phase comparing method, a pulse modulating method, and a pseudo random signal modulating method. The outline of these methods will be described hereinbelow.

(1) Phase Comparing Method

As the phase comparing method, for example, there is such a method as disclosed in Japanese Patent Unexamined Publication No. Sho-62-75363. This method will be described hereinbelow with reference to FIG. 1.

Laser light emitted from a laser oscillator 21 is distributed into two light paths by a half mirror 27. Laser light on one light path enters into an acoustoopic modulator 22. The acoustooptic modulator 22 generates diffraction light having a frequency shifted by an interaction with a high-frequency signal from a high-frequency oscillator 23. The diffraction light is transmitted to a target 17 via a reflection mirror 44. A detector 43 monitors the diffraction light, that is, laser light. Light reflected on the target 17 enters into a heterodyne detector 40 through a half mirror 28.

On the other hand, laser light on the other light path provided from the half mirror 27 enters into the heterodyne detector 40 through the half mirror 28 to serve as reference light. The heterodyne detector 40 heterodyne-detects a differential frequency signal representing the frequency difference between the reflected wave from the target and the reference light from the half mirror 28. Because the phase of the differential frequency signal is delayed proportionally to the distance to the target, the distance to the target can be measured through the phase detector 42 which detects the phase difference between the reference signal from the high-frequency oscillator 23 and the differential frequency signal.

Because the phase comparing method employs a continuous wave sending system, reflected light from the target cannot be discriminated from unnecessary light, such as reflected light, leakage light, etc. from other places than the target, so that a large error may arise. In particular, when sensitivity is so high that weak reflected light can be detected, weak leakage light from an optical system related to radiation laser light may be detected by an optical system related to reception of light and may be superposed on the reflected light from the target to interfere therewith to thereby bring phase disorder, resulting in a large error.

(2) Pulse Modulating Method

For example, a pulse modulating method has been described in Japanese Patent Unexamined Publication No. Sho-58-76784. The method will be described hereinbelow with reference to FIG. 2.

Laser light from a laser oscillator 21 is distributed into two light paths by a half mirror 27. Light on one light path enters into an acoustooptic modulator 22 driven by a high-frequency oscillator 23. In the acoustooptic modulator 22, laser light is modulated to diffraction light having the frequency shifted. The diffraction light is passed through a slit 29, converged by a lens 54 and then enters into a light modulator 24. In the light modulator 24, the incident laser light is pulse-modulated with a pulse signal from a pulse generator 50. The pulse-modulated laser light is passed through a transmission optical system 11 and radiated toward a target 17. The reflected wave from the target 17 is passed through a reception optical system 12 and a half mirror 28 and enters into a light detector element 25.

Laser light on the other light path from the half mirror 27 is reflected on the half mirror 28 and then enters into the light detector element 25 so as to serve as reference light. The light detector element 25 heterodyne-detects the pulse-like reflected wave from the target 17 on the basis of the reference light to thereby generate a differential frequency signal pulse waveform representing the frequency difference between the reflected light and the reference light. The differential frequency signal pulse waveform is amplified by an intermediate-frequency amplifier 51 and then detected by a detector 52 so as to be a detection pulse waveform.

Because this detection pulse waveform is delayed by the propagation time of the laser light required for reciprocating the distance to the target, an information processing circuit 53 calculates the distance to the target 17 by measuring the time difference between a point of time when a pulse is generated by the pulse generator 50 and a point of time when the detection pulse waveform is obtained by the reception of the reflected light from the target 17.

Because the pulse modulating method uses an intermittent wave transmitting system, the reflected light from the target can be timely discriminated from unnecessary light reflected from obstacles even though such unnecessary light reflected from obstacles is present. In the pulse modulating method, however, not only is power of pulse-like light small on an average but the peak power of laser light to be transmitted is restricted because of problems of device configuration and safety. Accordingly, when the target is low in light reflectivity, the distance to the target cannot be measured. Therefore, when the target is low in light reflectivity, for example, a reflection tape having a large number of fine reflection substances on a surface thereof may be stuck to the target to increase the quantity of reflected light. However, the process for sticking such a reflection tape to the target is complex.

(3) Pseudo Random Signal Modulating Method

For example, a pseudo random signal modulating method has been described in Japanese Patent Unexamined Publication No. Sho-58-166281. This method will be described hereinbelow with reference to FIG. 3.

In a modulator 24, laser light generated by a laser oscillator 21 is subjected to intensity-modulation with a pseudo random signal generated by a pseudo random signal generator 60. The modulated laser light is radiated toward a target 17. Light reflected on the target 17 is received by a light detector element 25 and converted into an electric signal. Here, the waveform of the electric signal is stored in a high-speed storage device 62. In a delay correlation device 61, the correlation between the pseudo random signal generated by the pseudo random signal generator 60 and the reception pseudo random signal stored in the high-speed storage device 62 is calculated while delaying the pseudo random signal successively. The result of the correlation processing is given to a display recorder 63.

Because the phase of the pseudo random signal received as reflected light from the target 17 is delayed by the propagation time of light to the target 17, the correlation between the two signals is increased when a delay for the propagation time is given to the phase of the pseudo random signal generated by the pseudo random signal 60 so as to be used as a transmission signal. Accordingly, the distance to the target can be measured by measuring the delay time which maximizes the correlation.

Because the pseudo random modulating method uses a continuous wave transmitting system, the reflected wave from the target can be discriminated from the reflected wave from obstacles on the basis of the delay time for correlation processing even though such unnecessary reflected wave from obstacles is present. However, the pseudo random modulating method is complex in apparatus configuration and long in signal processing time. Specifically, the high-speed storage device and the delay correlation circuit may be constituted by analogue circuits or may be constituted by digital circuits. In the former case, the number of elements used is so large that the apparatus becomes complex in configuration. In the latter case, the operation processing is so complex that the processing speed becomes slow.

SUMMARY OF THE INVENTION

An object of the present invention is to provide a distance measuring method and an apparatus therefor, in which not only the influence of unnecessary light can be avoided but the apparatus configuration can be simplified.

Another object of the present invention is to provide a distance measuring apparatus in which distance measurement is made by using an arbitrary pseudo random signal such as a Barker code signal.

According to an aspect of the present invention, in the distance measuring method and the apparatus therefor, generated are first and second pseudo random signals which are equal to each other in pattern but slightly different from each other in frequency. Then, a first time-series pattern is generated by multiplying the first and second random signals by each other. Laser light is radiated toward a target after the laser light is intensity-modulated with the first pseudo random signal. Then, light reflected from the target is received and converted into an electric signal. The electric signal as a reception signal is multiplied by the second pseudo random signal to generate a second time-series pattern. The distance to the target is measured by measuring the time difference between the first and second time-series patterns.

That is, in the present invention, because the first and second pseudo random signals are code trains which are equal to each other in pattern but are slightly different from each other in frequency, the phases of the two signals may be matched with each other at a certain point of time but then will be shifted gradually with the passage of time. When the phases of the two signals are shifted by one code or more from each other, the two signals have no correlation. Accordingly, the result of multiplication of the two signals is so random that no output is generated when the two signals are passed through a low-pass filter.

With further passage of time and when the phase difference between the first and second pseudo random signals corresponds to one period of one pseudo random signal, the phases of the two signals are matched with each other so that the correlation between the two signals takes its maximum value. In this case, a peak signal is obtained when this result of multiplication passes through the low-pass filter. This phenomenon is repeated so that a periodic pulse signal is obtained as an output from the low-pass filter.

Here, the pulse signal obtained by passing the result of multiplication of the first and second pseudo random signals by each other through the low-pass filter is called "time reference signal". The distance to the target can be measured by a simple-configuration apparatus through detecting the difference between the pulse generation time obtained by passing the result of multiplication of the reception signal of laser wave reflected on the target by the second pseudo random signal and the time reference signal.

Accordingly, even though unnecessary light such as leakage light from an optical system is present, the point of time when a pulse due to light reflected on the target is generated on the detection signal can be discriminated from the point of time when a pulse due to the unnecessary light is generated, because the two points of time are different from each other. According to the present invention, not only the distance to the target can be measured without any influence of unnecessary light but the signal processing time required for obtaining the detection signal is so shortened that the real-time and sensitive distance measurement can be made.

According to another aspect of the present invention, the distance measuring apparatus has a first multiplier for multiplying a first pseudo random signal by a second pseudo random signal, a laser light generation means, a modulation means for intensity-modulating laser light with the first pseudo random signal, a light transmission means for radiating an output of the modulation means to a target, a light detector means for receiving reflected light from the target and for converting the reflected light into an electric signal, a second multiplier for multiplying an output of the light detector means by the second pseudo random signal, and a time difference measurement means for measuring the time difference between a time-series pattern which is an output of the first multiplier and a time-series pattern which is an output of the second multiplier.

According to a further aspect of the present invention, the distance measuring apparatus has a semiconductor laser as the laser light generation means and the modulation means. The semiconductor laser is directly driven by the first pseudo random signal to thereby obtain laser light directly intensity-modulated with the first pseudo random signal.

According to a still further aspect of the present invention, the laser light generation means includes a laser light source, a high frequency generator, and an acoustooptic modulation element supplied with output laser light of the laser light source and driven by an output of the high frequency generator. The light detector means includes a branch means for branching a part of the laser light of the laser light source, a light detector element for combining output light of the branch means and the reflected light from the target to perform heterodyne detection thereby outputting a result of detection as the electrical signal.

According to another aspect of the present invention, the time difference measurement means includes a first low-pass filter supplied with the output of the first multiplier, a second low-pass filter supplied with the output of the second multiplier, and means for measuring a time interval between a point of time when an output signal of the first low-pass filter takes its maximum value and a point of time when an output signal of the second low-pass filter takes its maximum value.

According to a still further aspect of the present invention, the pseudo random signal generator includes a counter for counting a clock signal and for outputting its count value, a storage device from which stored data is read out in accordance with the count value of the counter as an address for the storage device, and a signal convertor for converting the readout stored data into a three-values signal, and the light detector means is capable of temporarily changing light signal reception sensitivity.

The counter in the pseudo random signal generator receives a clock signal from a clock signal generator, counts the clock signal and supplies the count value to the storage device. When the count value reaches its upper-limit value, the counter is reset to zero and then restarts its counting operation. At this time, a reset signal is supplied to the light detector means. The light detector means changes its sensitivity for a predetermined time on the basis of the reception of the reset signal. The storage device designates data in the storage region thereof with the counter value of the counter as an address thereof to thereby perform read-out of the designated data. Code data for forming an arbitrary pseudo random signal such as a Barker code signal are preliminarily stored in the storage region of the storage device.

Because a pseudo random signal generator constituted by a counter, a storage device and a signal convertor is used in the present invention as described above, any pseudo random signal such as a Barker code signal other than the M type signal can be utilized. For example, if such a Barker code signal is used as the pseudo random signal, a time interval can be provided at every period of output of the Barker code signal so that intermittent signal output is performed, the light-receiving sensitivity of the apparatus is temporarily changed, and unnecessary reflected signals are temporarily masked to thereby make it possible to detect the reflected signal from the target with high sensitivity.

The above and other objects as well as advantageous features of the present invention will become clearer from the following description taken in conjunction with the drawings.

DESCRIPTION OF THE PREFERRED EMBODIMENTS

Figure 4:
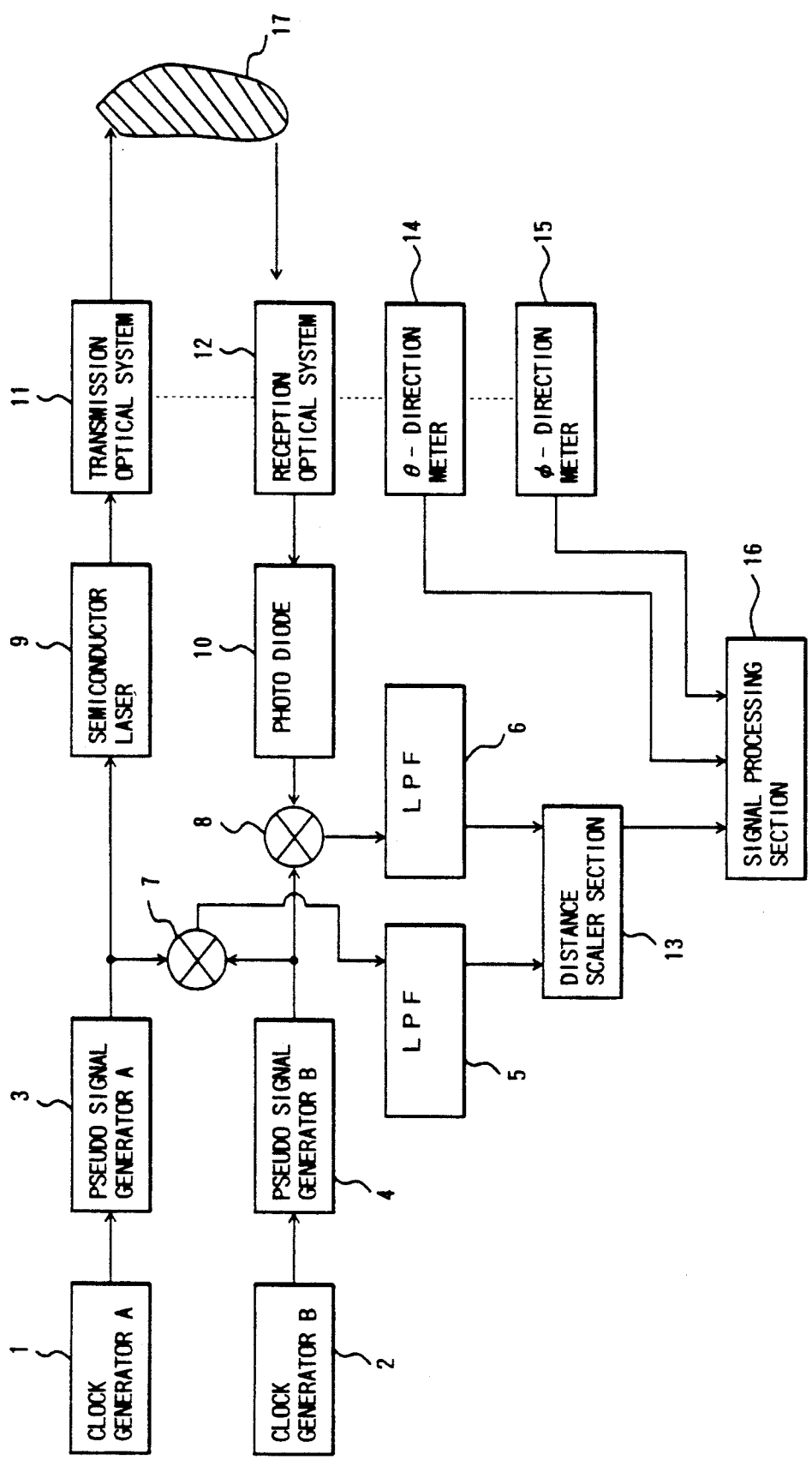
FIG. 4 is a block diagram of an embodiment of the distance measuring apparatus according to the present invention.

In a distance measuring apparatus shown in FIG. 4 as an embodiment of the present invention, a clock generator 1 has a frequency $f_1(=100.004$ MHz) and another clock generator 2 has a frequency $f_2(=99.996$ MHz). Each of the clock generators 1 and 2 keeps its frequency stable by the use of a quartz oscillator. Pseudo random signal generators 3 and 4 each have the same circuit configuration. Each of the pseudo random signal generators 3 and 4 generates an M-type signal as a pseudo random signal.

Figure 5:
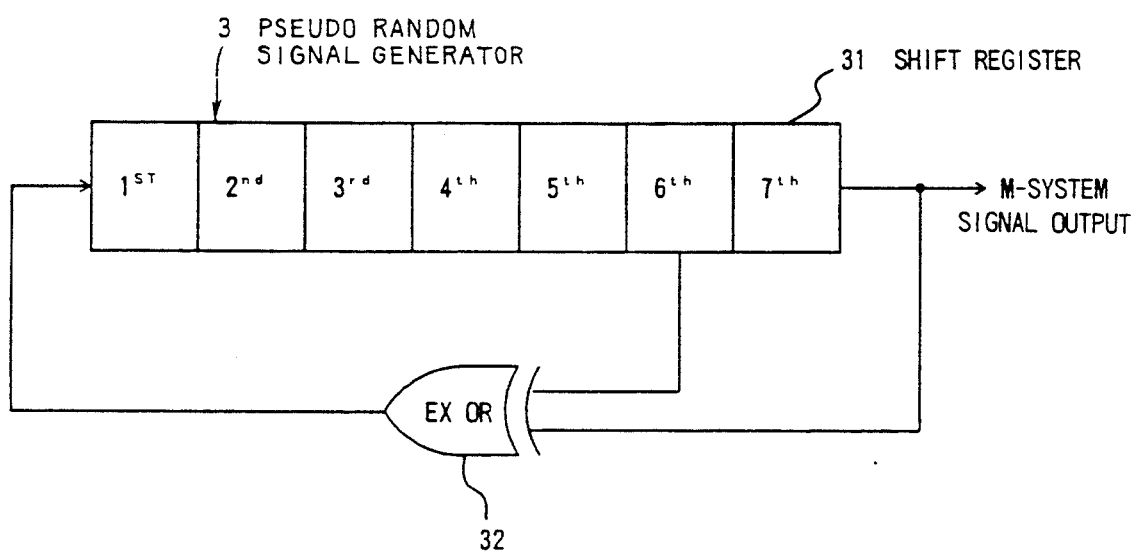
FIG. 5 is a block diagram showing an example of the configuration of the pseudo signal generator.

Each of the pseudo random signal generators 3 and 4 for generating such an M-type signal may be constituted by a 7-bit M-type signal generator, as shown in FIG. 5, for example, composed of a shift register 31 of a 7-stage structure based on an ECL (emitter-coupled logic) element and an exclusive OR circuit 32. The M-type signal is a periodically circulating signal having a combination of codes "I" (corresponding to a positive voltage $+E$) and "O" (corresponding to a negative voltage $-E$). In this example of 7 bits, one period is completed when $127(=2^7-1)$ signal chips are generated, and a circulating signal repeating this period is generated.

The pseudo random signal generators 3 and 4 each have the same circuit so that the respective output signals from the pseudo random signal generators 3 and 4 each have the same pattern. However, the pseudo random signal generators 3 and 4 are slightly different in period from each other because the clocks supplied thereto are different in frequency from each other. Other than the M-type signal, any type signal such as a Gold-type signal or a JPL-type signal may be used as a pseudo random signal.

In the distance measuring apparatus shown in FIG. 4, for example the semiconductor laser 9 has a wavelength of 780 nm and generates laser light intensity-modulated with a signal from the pseudo random signal generator 3. The laser light is radiated to a target 17 through a lens in a transmission optical system 11. Light reflected from the target 17 enters into a diode 10 via a lens, an optical filter, etc. in a reception optical system 12. Then, the intensity of the reflected light is converted into an electric signal to thereby obtain a reception signal. The reception signal is multiplied, by means of a balanced mixer 8, by the second pseudo random signal which is an output of the pseudo random signal generator 4. The multiplication signal is supplied, as a target detection signal, to a distance scaler 13 via a low-pass filter 6.

On the other hand, the first and second pseudo random signals generated by the pseudo random generators 3 and 4 are multiplied by each other by means of a balanced mixer 7. The multiplication signal is supplied, as a time reference signal, to the distance scaler 13 via a low-pass filter 5. The distance scaler 13 has a function for scaling the distance to the target 17 through detecting both the peak of the target detection signal and the peak of the time reference signal and measuring the time difference between the points of time when the peaks are respectively generated.

The first and second pseudo random signals generated by the respective pseudo random signal generators 3 and 4 as described above are code trains equal in pattern to each other. However, the periods of the two signals are slightly different from each other according to the difference between the driving clock frequencies supplied therefor respectively. Assuming now that the phases of the respective signals are matched with each other at a certain point of time, then the phases are gradually shifted from each other with the passage of time. When the phases are shifted by one code or more from each other, the two signals have no correlation. When there is no correlation between the second pseudo random signal and the reception signal as reflected light from the target 17 after radiating laser light intensity-modulated with the first pseudo random signal, the result of multiplication of the two signals by each other by means of the balanced mixer 8 becomes a random signal having no direct-current component, so that the output signal of the low-pass filter 6 takes a value of zero.

Figure 6:
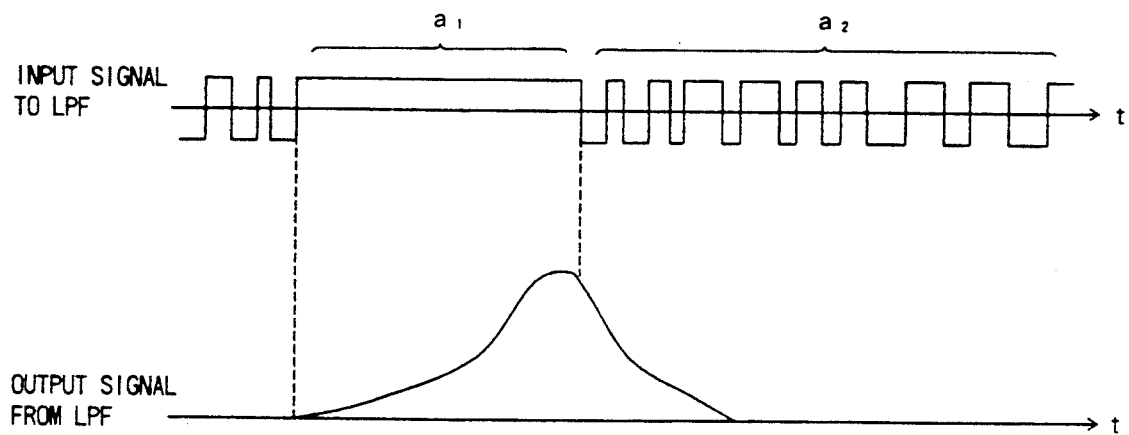
FIGS. 6 and 7 are waveform views from explaining the operation of the apparatus depicted in FIG. 4.

With further passage of time and when the phase difference between the first and second pseudo random signals just corresponds to one period of one pseudo random signal, the phases of the two signals are matched with each other again. At this time, correlation between the two signals is maximized so that a peak signal is obtained when the multiplication output from the balanced mixer 8 is passed through the low-pass filter 6. FIG. 6 is a waveform view showing the input and output signal to and from the low-pass filter 6. In the region $a_1$, the phases of the two pseudo random signals are matched with each other, so that the integrated value thereof increases to its maximum. In the region $a_2$, the phases are not matched with each other, so that the integrated value thereof decreases to zero. The phenomenon applies to the low-pass filter 5 which will be described in detail later.

Figure 7:
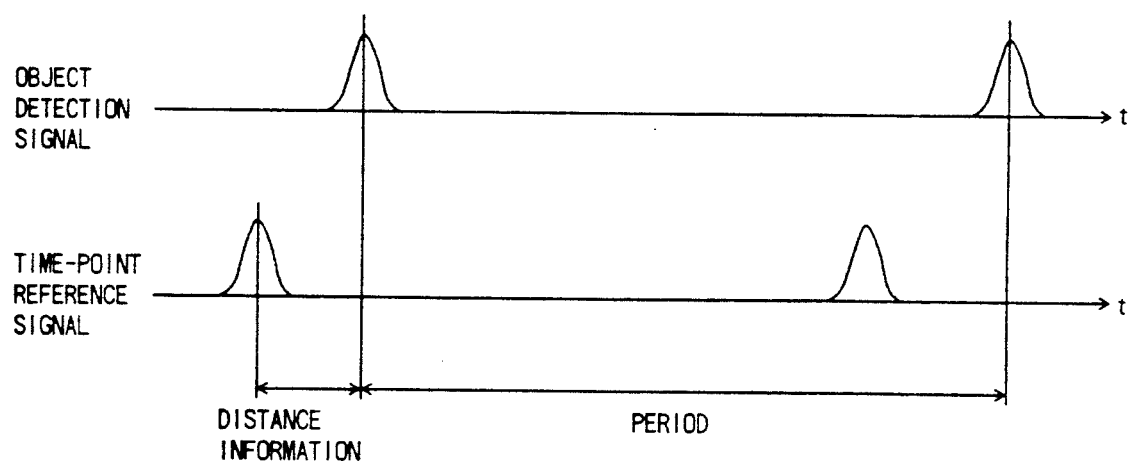

The phase-matching phenomenon is repeated every period, so that a periodic pulse signal as shown in FIG. 7 is obtained as a detection signal of the reflected wave from the target 17. On the other hand, in order to set a time reference signal for measuring a point of time when the detection signal is obtained from the target, a periodic pulse signal having the same period as that of the target detection signal is formed by directly multiplying the first and second pseudo random signals by each other by means of the balanced mixer 7 and by picking out a time series pattern as a result of the multiplication through the low-pass filter 5. The period pulse signal thus formed is provided as a time reference signal shown in FIG. 7.

Accordingly, the time interval from the point of time when a pulse of the time reference signal is generated to the point of time when a pulse of the target detection signal is generated is obtained as distance information proportional to the reciprocation propagation time required for the laser light to propagate forward from the transmission optical system 11 to the target 17 and back from the target 17 to the reception optical system 12, so that the distance to the target 17 is calculated by the distance scaler 13.

Figures 10, 12:
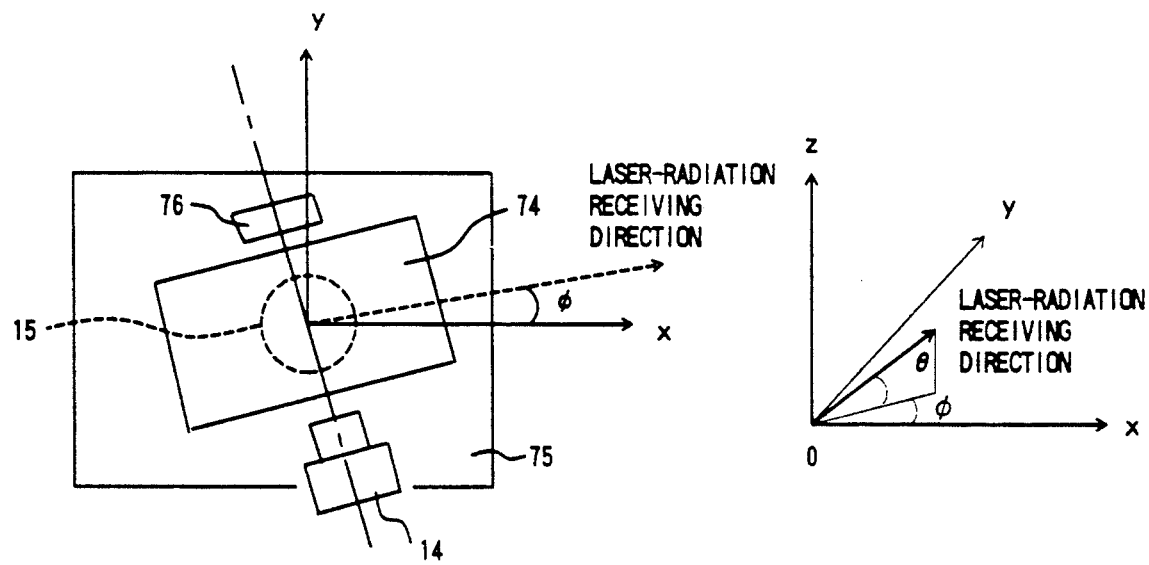
FIG. 12 is a graph showing laser-transmitting and laser-receiving directions in a coordinate system.

In the embodiment of FIG. 4 and as indicated in the graph of FIG. 12, the volumetric shape of the target 17 can be measured in a signal processing section 16 by detecting the directions of laser radiation and reception in the transmission and reception optical systems 11 and 12 through bi-directional angle measures using two rotary encoders, that is, on the basis of angle information from a $\theta$-direction meter 14 and a $\phi$-direction meter 15.

In this embodiment, it has been confirmed that the distance can be measured at a response speed of 0.1 second per point with distance measuring accuracy of about 15 mm.

Figure 8:
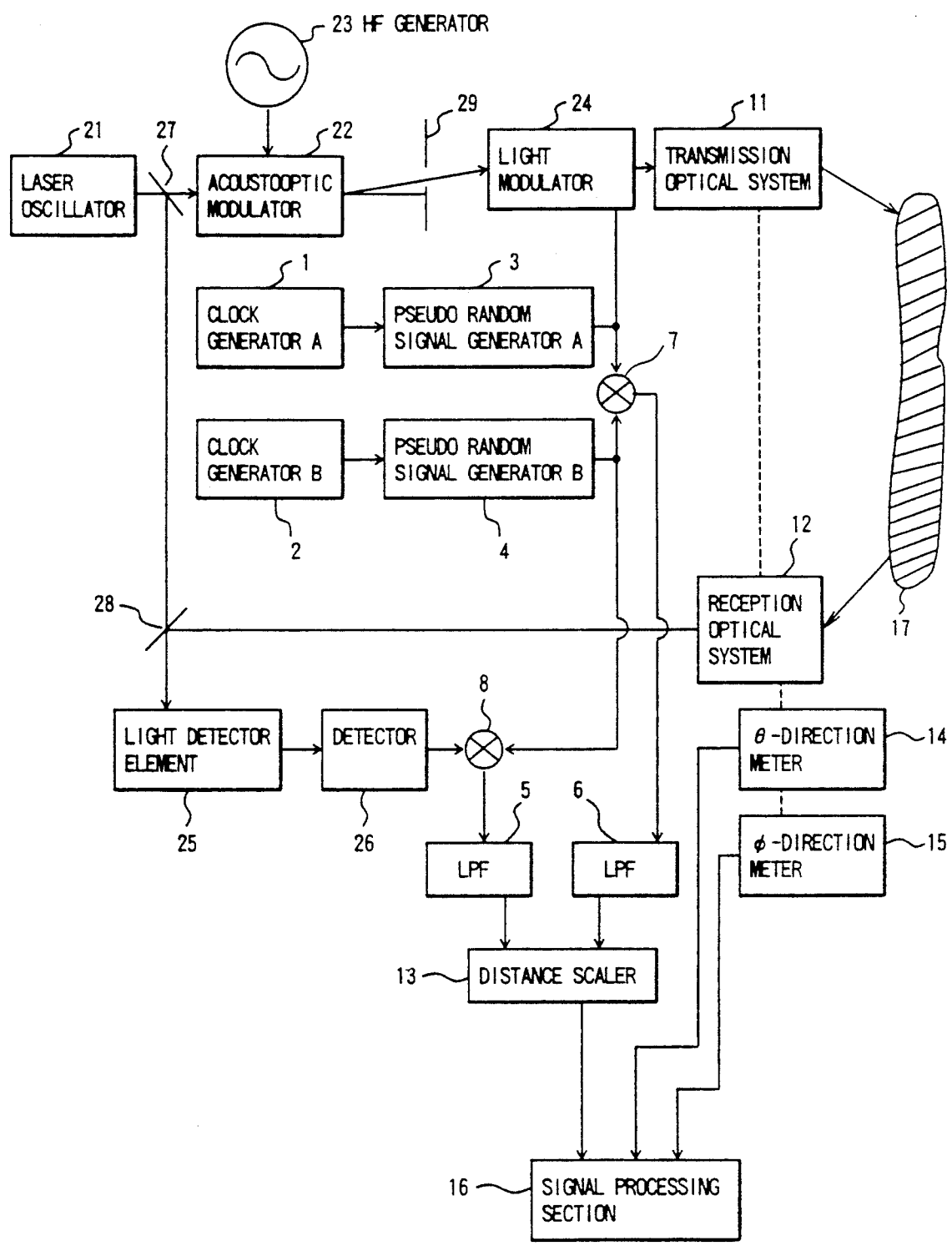
FIG. 8 is a block diagram of another embodiment of the distance measuring apparatus according to the present invention.

In another embodiment of the distance measuring apparatus according to the present invention, as shown in FIG. 8, the sensitivity is further improved by applying the pseudo random signal processing to a heterodyne-detection laser distance measuring apparatus. For example, in this apparatus, the clock frequencies of the clock generators 1 and 2 are selected to be 200,010 MHz and 200,100 MHz, respectively.

The pseudo random signal generators 3 and 4 each have the same circuit configuration. Each of the pseudo random signal generators 3 and 4 generates an M-type signal as a pseudo random signal through an 8-stage shift register. A laser oscillator 21 is constituted by an He-Ne laser oscillator. Output laser light from the laser oscillator 21 is distributed into two directions by a half mirror 27. Light in one direction enters into an acoustooptic modulator 22 driven by a high-frequency oscillator 23. Diffracted light shifted by the frequency of a high-frequency signal enters into a light modulator 24 through a slit 29. In the light modulator 24, the laser light is intensity-modulated with the M-type signal generated by the pseudo random signal generator 3. The laser light modulated by the light modulator 24 is radiated to the target 17 through the transmission optical system 11.

Laser light reflected from the target 17 is received by the reception optical system 12 and enters into a light detector element 25 through a half mirror 28. The light detector element 25 performs heterodyne detection upon the received laser light to generate a high-frequency electric signal having the amplitude corresponding to the intensity of the received laser light. The amplitude-modulated high-frequency signal is detected by the detector 26, multiplied by means of the balanced mixer 8 by the M-type signal generated by the pseudo random signal generator 4 and then supplied as a target detection signal to the distance scaler 13 through the low-pass filter 5.

On the other hand, the output signals from the pseudo random signal generators 3 and 4 are multiplied by each other by means of the balanced mixer 7. The result of multiplication is supplied as a time reference signal to the distance scaler 13 through the low-pass filter 6. The distance scaler 13 calculates the distance through detecting both the peak of the target detection signal and the peak of the time reference signal and measuring the difference between points of time when the signals respectively take their peaks.

Also in this embodiment of FIG. 8, the $\theta$-direction meter 14 and $\phi$-direction meter 15 using rotary encoders respectively are provided for the purpose of measuring the directions of laser radiation and reception in the transmission and reception optical systems, so that bi-directional angle information is supplied to the signal processing section 16. In the signal processing section 16, the volumetric shape of the target 17 can be measured on the basis of the calculated distance value of the distance scaler 13.

In this embodiment, it has been confirmed that the distance can be measured at a response speed of 0.14 sec per point with the distance measuring accuracy of about 10 mm.

The angle information obtained from the bi-directional angle meters 14 and 15 as shown in FIGS. 4 and 8 may be used in combination with distance information obtained from the distance measuring apparatus to thereby measure the volumetric shape of the target as follows.

Figures 9, 11:
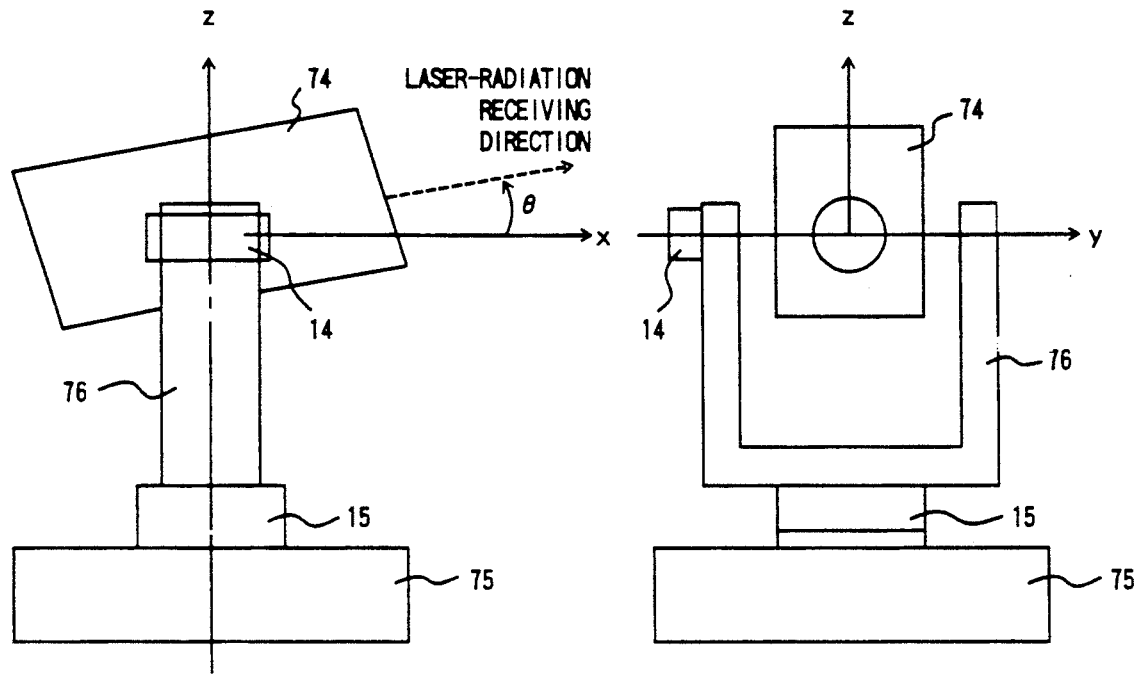
FIGS. 9, 10 and 11 are a side view, a top view and a front view of a laser distance measuring apparatus.

In the laser distance measuring apparatus as shown in FIGS. 9 through 11, each of the $\theta$-direction meter 14 and the $\phi$-direction meter 15 is constituted by a high-accuracy increment-type rotary encoder which generates 360,000 pulses in one rotation. The circuit configuration as shown in FIG. 4 or FIG. 8 is incorporated in a laser distance measuring apparatus body 74, so that laser light is radiated/received in the direction of the arrow to measure the distance to the target. The $\phi$-direction meter 15 is mounted on a pedestal 75. A yoke 76 is further attached on the meter 15. The yoke 76 supports the laser distance measuring apparatus body 74 so that the body 74 can rotate in the $\theta$ direction. The yoke 76 itself can rotate on the $\phi$-direction meter 15.

Assuming that a measured value r of the distance to the target is obtained by distance measurement in a certain direction ($\theta$, $\phi$) as shown in FIG. 12, the volumetric coordinates (x, y, z) of the target are calculated by the signal processing section according to the following expressions.

$$x = r \cdot \cos \theta \cdot \cos \phi$$

$$Y = r \cdot \cos \theta \cdot \sin \phi$$

$$z = r \cdot \sin \theta.$$

The volumetric shape of the target can be perfected as coordinate information (x, y, z) by repeating the aforementioned measurement and calculation while scanning both angles $\theta$ and $\phi$.

Figures 13, 14, 15:
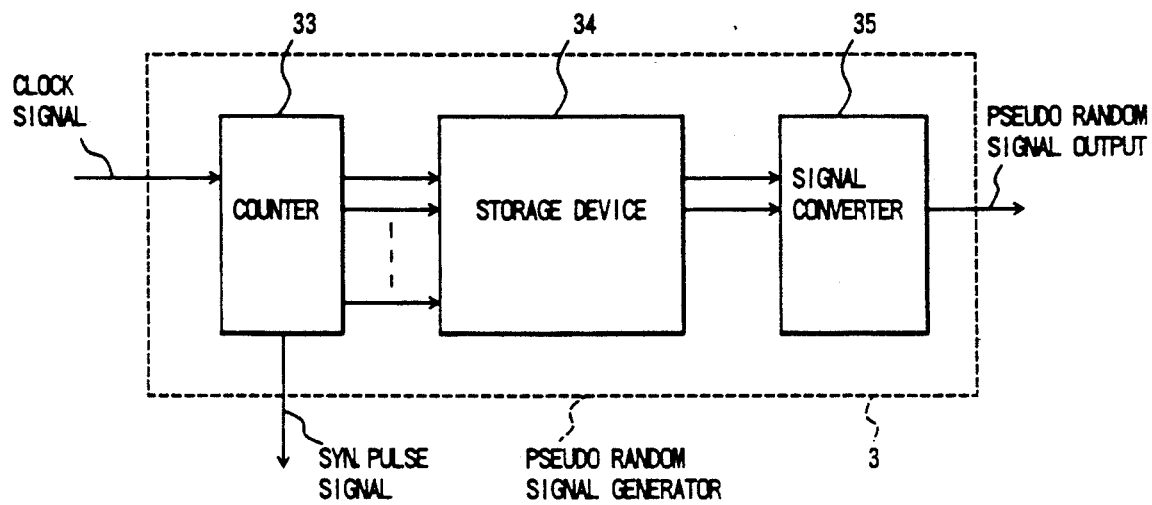
FIG. 13 is a block diagram showing another example of the configuration of the pseudo random signal generator.
FIG. 14 is a view showing data stored in the storage device depicted in FIG. 13.
FIG. 15 is a view showing the relationship between an input data and an output signal in the signal convertor depicted in FIG. 13.

Although the above description has been made wherein a shift register is used in each of the pseudo random signal generators 3 and 4 as shown in FIGS. 4 and 8, the present invention can be applied to the case where a pseudo random signal generator as shown in FIG. 13 may be used. The pseudo random signal generator as shown in FIG. 13 is constituted by a counter 33, a storage device 34, and a signal convertor 35.

The counter 33 receives a clock signal as an input signal, counts the input clock signal and supplies the count value to the storage device 34. The counter 33 carries out a counting operation from 0 to a count upper-limit value n. When the count reaches the upper-limit value n, the counter is reset to 0 and then restarts the counting operation.

In this embodiment, the upper-limit value is 127, so that the counter 33 repeats the counting operation from 0 to 127 in synchronism with the supplied clock signal. When the counter is reset to 0, a synchronizing pulse signal is outputted to the outside.

The storage device 34 has memories for storing data, constituted by ROM, RAM, etc. The storage device 34 receives the output count value from the counter 33, reads out code data of the pseudo random signal stored in a memory by using the count value as an address of the memory and supplies the read-out data to the signal convertor 35.

In this embodiment the storage device 34 has 128 memories each having a capacity for a data length of 2 bits and being designated by addresses of from 0 to 127. The first bit of each memory represents the code pattern of the pseudo random signal to be stored. Accordingly, the first bit is set to "1" or "0" corresponding to the code "1" or "0" of the pseudo random signal. The second bit of each memory represents whether the data in the memory is a code data of the pseudo random signal or not. When the data in the memory is a code data, the second bit of the memory is set to "1" while when the data in the memory is not a code data, the second bit is set to "0".

The table in FIG. 14 shows an example of the case where seven Barker code data are stored in the memories of the storage device 34. In this example, 2-bit data represented by "11" and "10" corresponding to the Barker code data are stored the memories corresponding to the addresses 0 through 6, and at the same time, 2-bit data represented by "00" are stored in the other memories corresponding to the addresses 7 through 127. Because data corresponding to the addresses 0 through 127 are successively read out on the basis of the input signal supplied from the counter 33, the operation of reading data from the storage device 34 is repeated with a period of 128 clock pulses in synchronism with the clock signal supplied to the counter 33.

The table of FIG. 15 shows the relationship between the input data and the output signal of the signal convertor 35 in this embodiment. The signal convertor 35 receives data from the storage device 34, converts the data into a three-valued signal and outputs it. That is, when the 2-bit data given from the storage device 34 is "11" or "10" representing a code data, the signal convertor 35 generates a positive (+) or negative (−) signal corresponding to the data. When the 2-bit data is "00" or "01", the signal convertor 35 generates a zero (0) signal.

Figure 16:
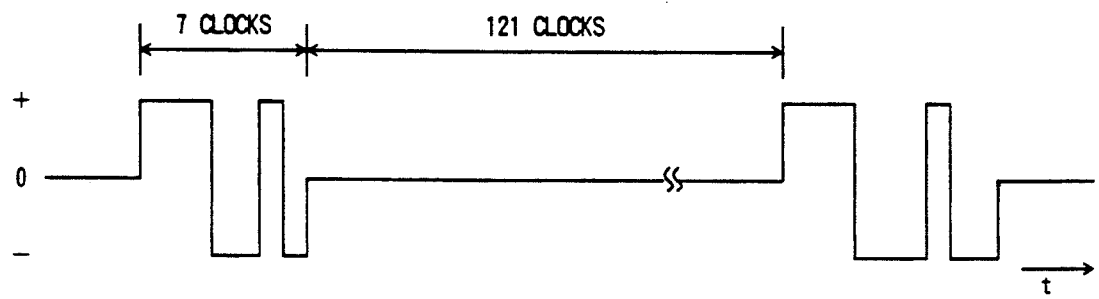
FIG. 16 is a view showing an output waveform from the signal convertor.

FIG. 16 shows the waveform of the output signal from signal convertor 35, that is, the waveform of the output signal from the pseudo random signal generator, in the case where data are supplied from the storage device 34 having such memory contents as shown in FIG. 14. In respect to the output wave form, a positive (+), negative (−) or zero (0) signal is sent out corresponding to the data read from the storage device 34. Because the operation of reading-out data from the storage device 34 is repeated at a period determined by the number of memories in the storage device 34 in synchronism with the clock signal, the output signal from the signal convertor 35 has a waveform formed by repeating 7-clock-pulses Barker code output signals and 121-clock-pulses zero signals.

In the following, the operation of the distance measuring apparatus in the case where the pseudorandom signal generators 3 and 4 as shown in FIG. 13 are applied to the distance measuring apparatus as shown in (FIG. 13 are applied to the distance measuring apparatus as shown in) FIG. 4 or FIG. 8 is described. In this case, a synchronizing pulse signal is supplied from the pseudo random signal generator 3 to the reception optical system 12. The signal reflected from the target 17 is received by the reception optical system 12 and then sent out after changing the amplification of attenuation factor of the reflected signal in synchronism with the synchronizing pulse signal with the passage of time.

Figure 17:
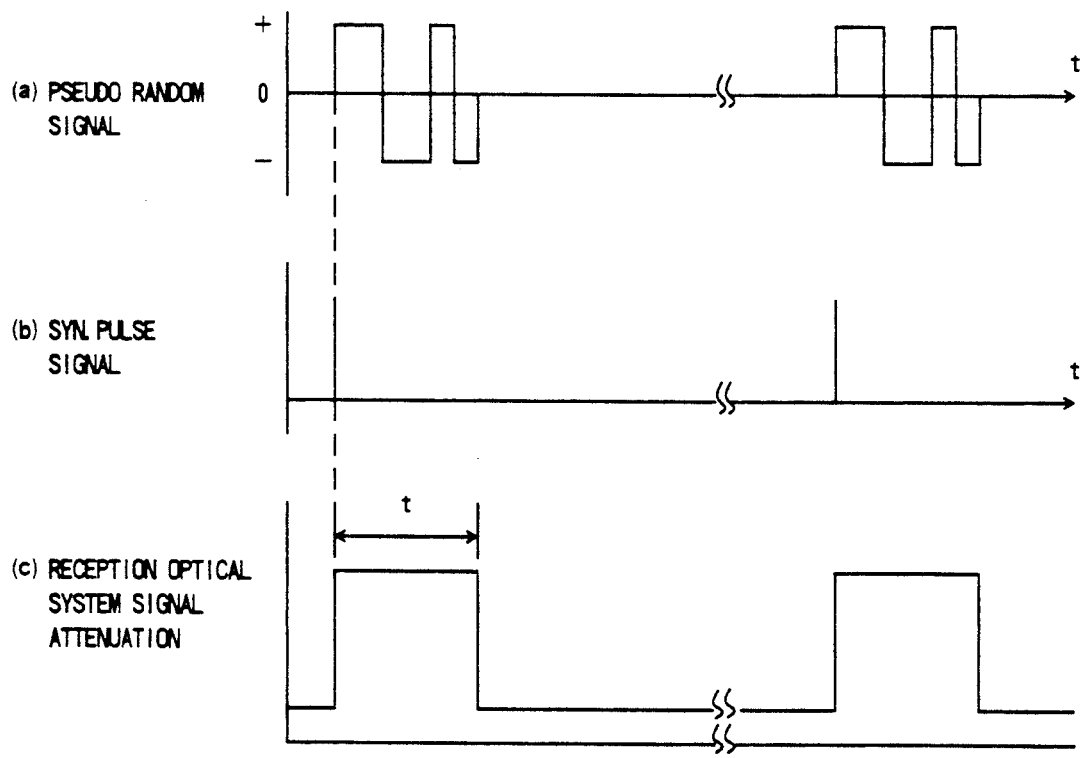
FIG. 17 shows timing charts for explaining the operation of the receiver in the distance measuring apparatus depicted in FIGS. 5 and 8.

FIG. 17 shows timing charts illustrating the operation of the reception optical system 12. In the timing charts, the diagrams (a) and (b) show the signal waveform of the pseudo random signal generated from the pseudo random signal generator 3 and the signal waveform of the synchronizing pulse signal, respectively. The diagram (c) of FIG. 17 shows the temporal change of the attenuation factor of the signal in the reception optical system 12. Upon reception of the synchronizing pulse signal from the pseudo random signal generator 3, the reception optical system 12 increases the attenuation factor for an arbitrary time t after the instance of the reception of the pulse so as to restrict the input of unnecessary reflected signals received for this time to thereby suppress the influence of the unnecessary reflected signals.

Therefore, in the case where the signal reflected from the target may be masked with unnecessary signals reflected from obstacles near the transmission and reception optical systems, the reception of the unnecessary reflected signals can be suppressed by changing the receiving sensitivity with the passage of time to thereby prevent the influence of the unnecessary reflected signals.

Figure 1:
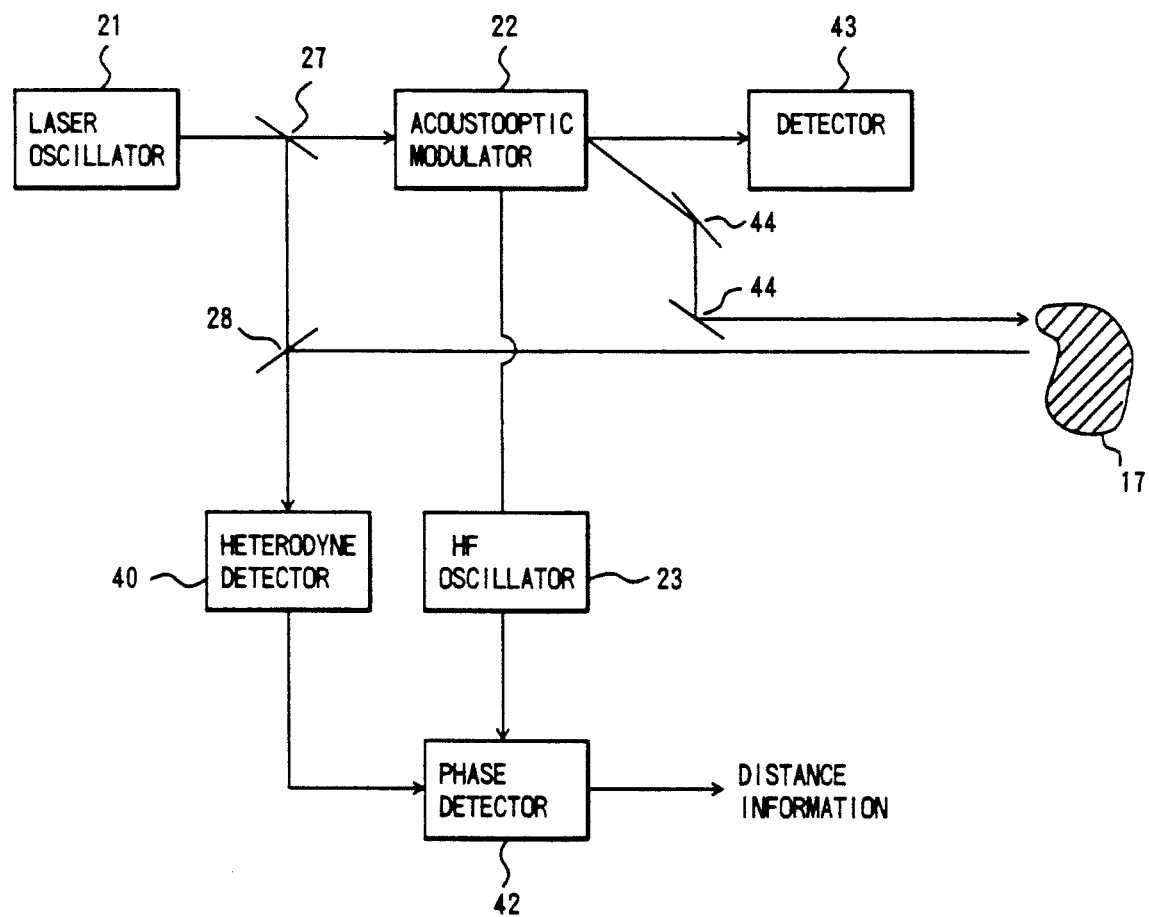
FIGS. 1, 2 and 3 are block diagrams of various examples of the conventional distance measuring apparatus.
Figure 2:
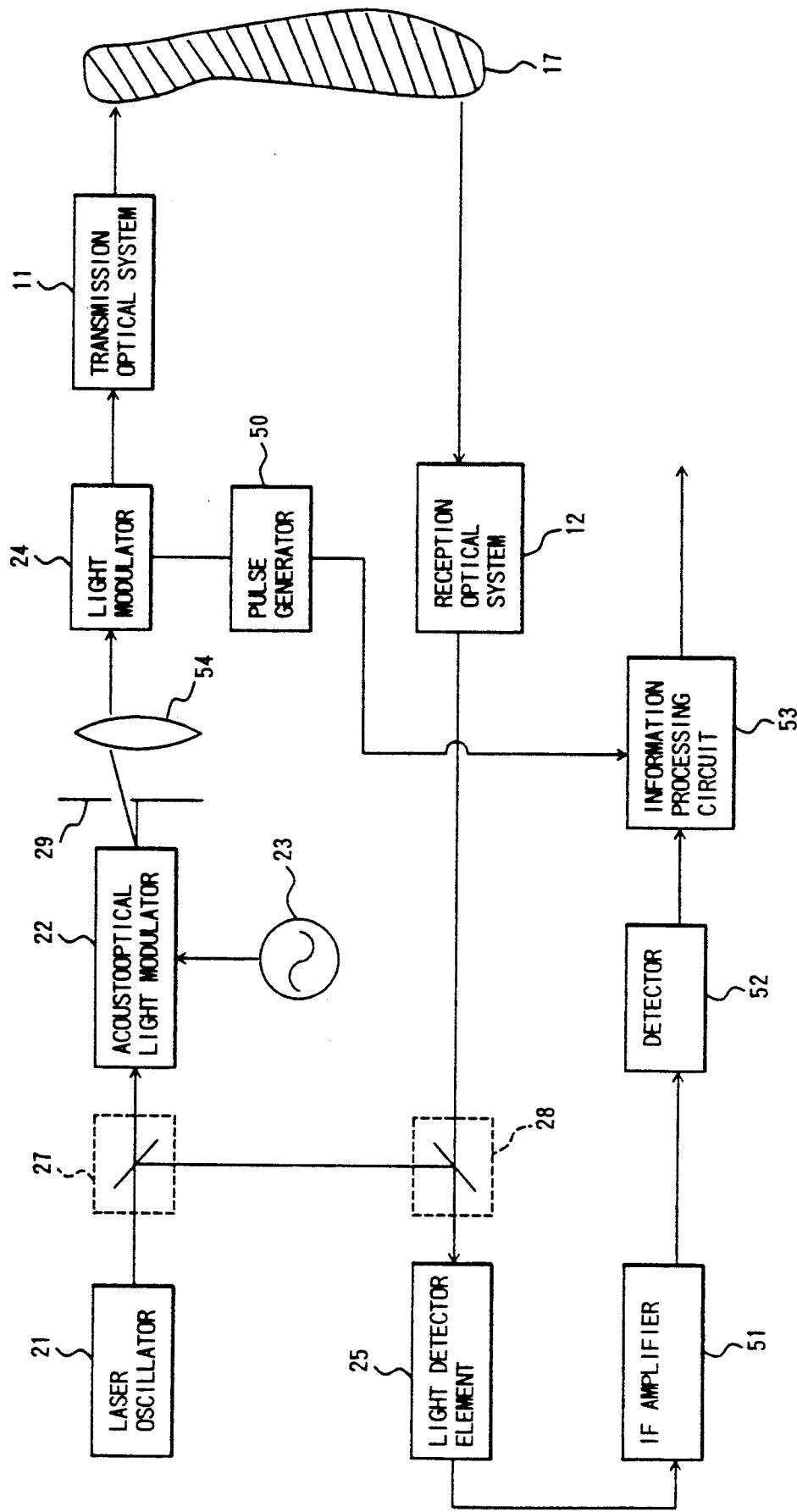
Figure 3:
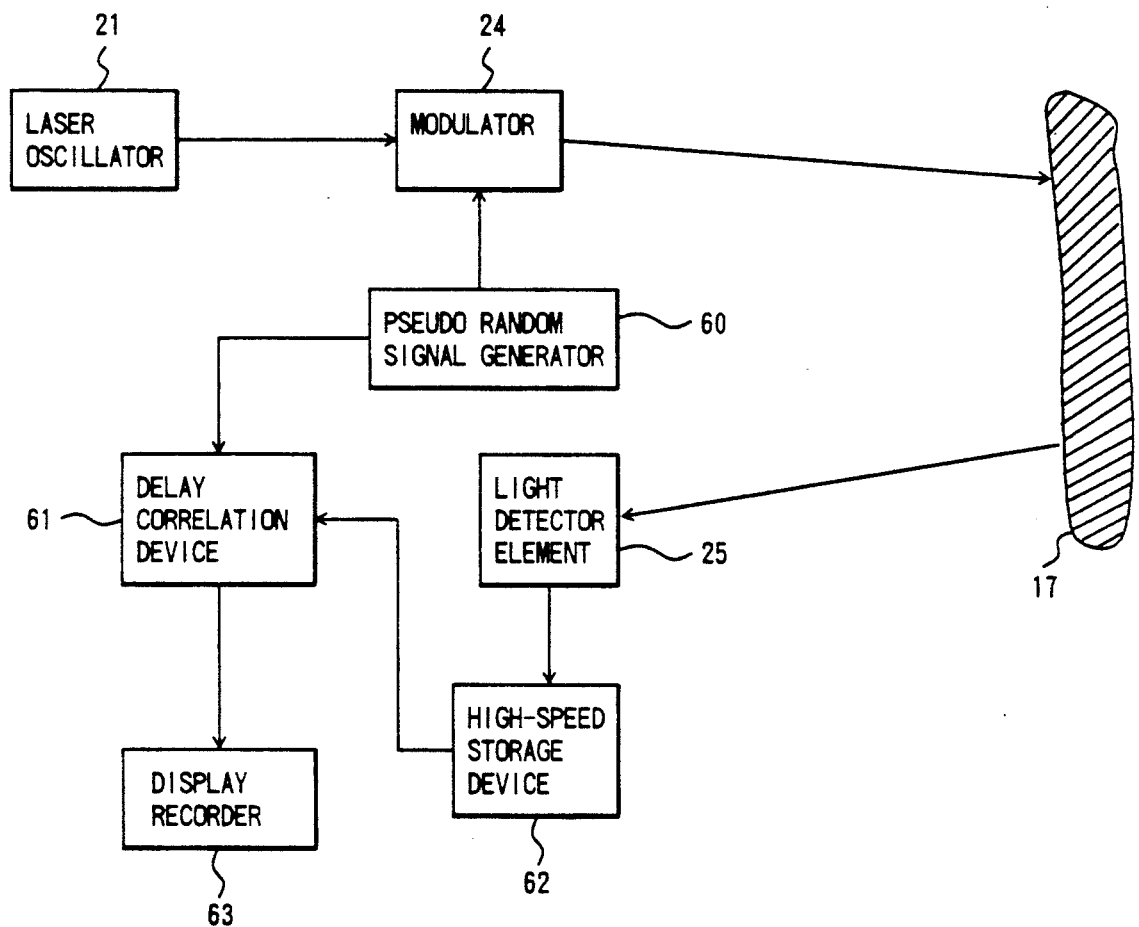

The pseudo random signal generator shown in FIG. 13 can be also applied to the distance measuring apparatus shown in FIG. 3. Example of such an application will be described hereinbelow with reference to FIGS. 18 and 19.

Figure 18:
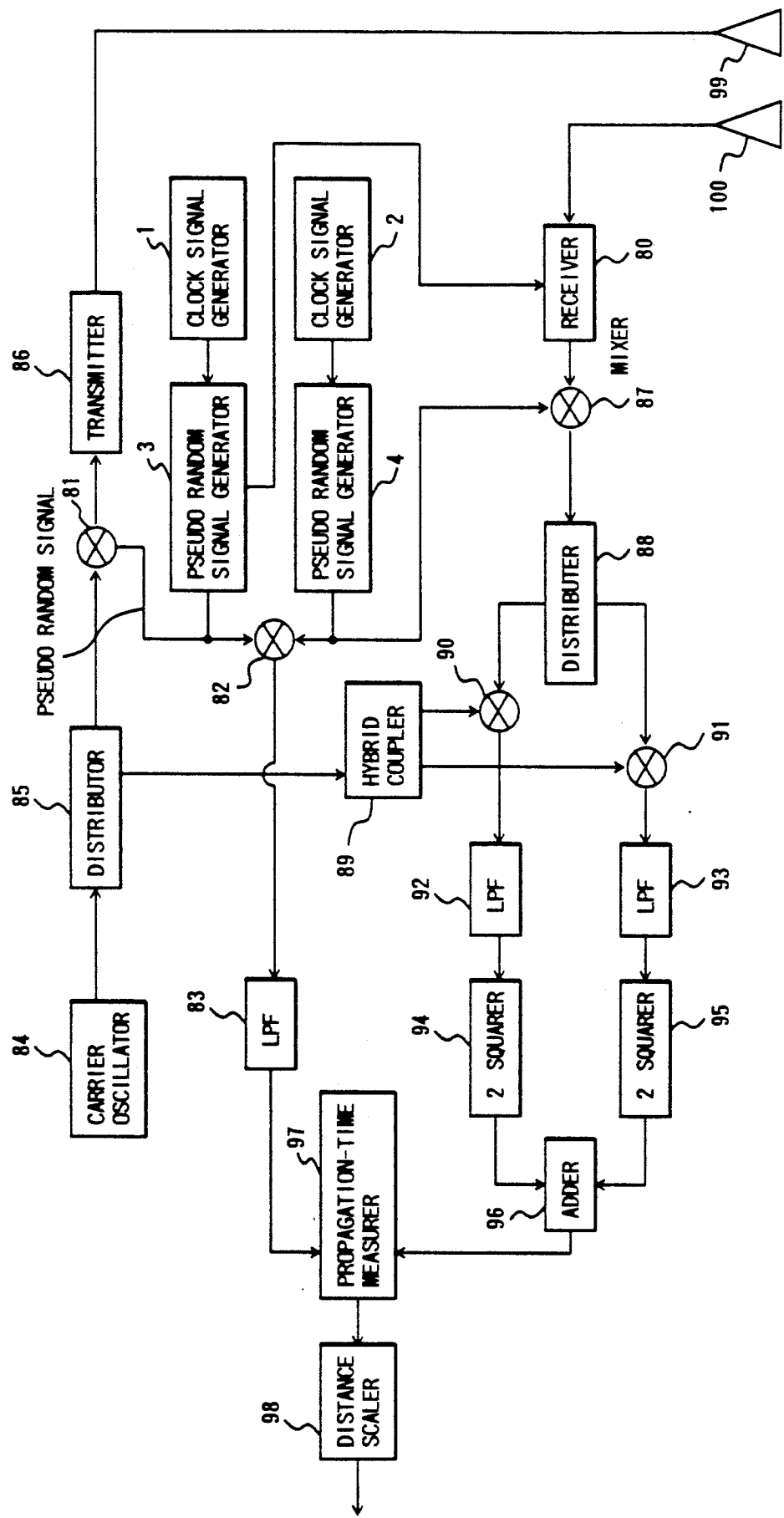
FIG. 18 is a block diagram of a further embodiment of the distance measuring apparatus according to the present invention.

The pseudo random signal generator shown in FIG. 13 is used in the distance measuring apparatus shown in FIG. 18. In this embodiment, pseudo random signals equal in pattern to each other but slightly different in frequency from each other are used in the pseudo random signal processing in the same manner as in the distance measuring apparatus of FIG. 4.

In the distance measuring apparatus shown in FIG. 18, the reference numeral 80 designates a receiver, 81 a multiplier (modulator), 82 a multiplier (mixer), 83 a low-pass filter, 84 a carrier oscillator, 85 a distributor, 86 a transmitter, 87 a multiplier (mixer), 88 a distributor, 89 a hybrid coupler, 90 and 91 (multipliers) mixers 92 and 93 low-pass filters, 94 and 95 squarers, 96 an adder, 97 a propagation-time measurer, 98 a distance scaler, 99 a transmission antenna and 100 a reception antenna.

The operation of the apparatus will be described hereinbelow. Each of the pseudo random signal generators 3 and 4 has a structure as shown in FIG. 13 and generates a signal having a waveform as described above.

Each of clock generators 1 and 2 includes a quartz oscillator by which a clock signal sufficiently stable in frequency is generated. However, the clock generators 1 and 2 are slightly different in the frequency generated from each other. In this embodiment, the frequencies $f_1$ and $f_2$ generated by the clock generators 1 and 2 are selected to be 100,004 MHz and 99,996 MHz, respectively, so that the difference $f_1-f_2$ between the frequencies is 8 KHz. The clock signals $f_1$ and $f_2$ respectively generated from the clock generators 1 and 2 are respectively supplied to the pseudo random signal generators 3 and 4. The pseudo random signal generators 3 and 4 generate signals as shown in FIG. 16 which are equal in pattern to each other but slightly different from each other in their one period on the basis of the difference in frequency between the driving clock signals. Here, the periods of the two signals $B_1$ and $B_2$ are calculated as follows.

$$(\text{Period of } B_1) = 127 \times 1/100.004 \text{ MHz} \approx 1269.9492 \text{ ns}$$

$$(\text{Period of } B_2) = 127 \times 1/99.996 \text{ MHz} \approx 1270.0508 \text{ ns}.$$

Accordingly, the two signals $B_1$ and $B_2$ have substantially the same period of about 1270 ns ($10^{-9}$ sec) but a time difference of about 0.1 ns. Therefore, if the two signals $B_1$ and $B_2$ are circulatedly generated and then the patterns of the two signals are matched with each other at a certain point of time $t_o$, a time difference of 0.1 ns arises between the two signals whenever one period is passed, or in other words, a time difference of 10 ns arises between the two signals when 100 periods are passed.

Because each of the signals has 127 signal chips generated in a period of 1270 ns, the time required for generating one signal chip is 10 ns. Accordingly, the fact that a time difference of 10 ns arises between the two signals $B_1$ and $B_2$ represents the fact that the signals are diverged by one signal chip from each other. The output $B_1$ from the pseudo random signal generator 3 is supplied to the multipliers 81 and 82. The output $B_2$ from the pseudo random signal generator 4 is supplied to the multipliers 82 and 87.

For example, the carrier generator 84 oscillates a microwave having a frequency of about 10 GHz. The output signal from the carrier generator 84 is distributed, by the distributor 85, into the multiplier 81 and the hybrid coupler 89. For example, the multiplier 81 is constituted by a double-balanced mixer. The multiplier 81 multiplies the carrier of about 10 GHz supplied from the distributor 85 by the signal $B_1$ supplied from the pseudo random signal generator 3 and supplies the transmitter 86 with a spectrum-diffused signal formed by phase-modulating the carrier.

The transmitter 86 power-amplifies the input spectrum-diffused signal converts it into an electromagnetic wave through the transmission antenna 99 and radiates it to the target. For example, each of the transmission antenna 99 and the reception antenna 100 is constituted by a horn antenna to narrow down the directivity sharply to thereby reduce electric power reflected on matters other than the target, as sufficiently as possible. For example, each of the two antennas has an antenna gain of about 20 dB.

The electromagnetic wave radiated from the transmission antenna 99 to the target is reflected from the target, converted into an electric signal through the reception antenna 100 and supplied to the receiver 80. Of course, the point of time when the input signal is supplied to the receiver 80 is delayed from the propagation time of the electromagnetic wave which reciprocates between the antenna position and the target, that is, it is delayed for the propagation time of the electromagnetic wave required between the point of time when the electromagnetic wave is radiated from the transmission antenna 99 and the point of time when the electromagnetic wave moves back to the reception antenna 100. The receiver 80 amplifies the input signal and supplies the amplified signal to the multiplier 87. The operation of the receiver 80 will be described in detail later.

On the other hand, the signals $B_1$ and $B_2$ respectively supplied from the pseudo random signal generators 3 and 4 to the multiplier 82 are multiplied by each other. The time-series signal representing the multiplication value is supplied to the low-pass filter 83. In the case where the phases of the two pseudo random signals supplied to the multipmlier 82 are matched with each other, an output voltage $+E$ is continued. In the case where the phases of the two signals are not matched with each other, an output voltage $+E$ and an output voltage $-E$ are produced at random. The low-pass filters 83, 92 and 93 have a kind of integral function based on band limitation for frequency. Accordingly, when the phases of the two signals are matched with each other, the output signal from the low-pass filters as a signal formed by integrating correlation values of the two signals is a pulse-like signal. When the phase of the two signals are not matched with each other, the output becomes zero.

Accordingly, a periodic pulse-like signal is produced in the output of the low-pass filter 83. The pulse-like signal is supplied, as a reference signal for time, to the propagation time measurer 97. In this embodiment, the period $T_B$ of the reference signal is 15.875 ms, because $f_1$ and $f_2$ are 100,004 MHz and 99,996 MHz, respectively.

The multiplier 87 is supplied with the reception signal from the receiver 80 and the M-type signal $B_2$ from the pseudo random signal generator 4 and multiplies those signals by each other. When the modulated phase of the reception signal formed by phase modulating the transmission carrier with the first signal $B_1$ is matched with the phase of the second signal $B_2$, the multiplication result from the multiplier 87 is supplied, as a matched-phase carrier signal, to the distributor 88. When the modulated phase of the reception signal is not matched with the phase of the signal $B_2$, the multiplication result from the multiplier 87 is supplied, as a random-phase carrier signal, to the distributor 88. The distributor 88 distributes the input signal into two, and the two output signals $R_1$ and $R_2$ from the distributor 88 are supplied to the multipliers 90 and 91, respectively.

The hybrid coupler 89 which receives a part of the transmission carrier from the distributor 85 supplies the multipliers 90 and 91 with an in-phase zero-phase component signal I having the same phase as the phase of the input signal and a quadrature (90°-phase) component signal Q having a phase perpendicular to the phase of the input signal, respectively.

The multiplier 90 multiplies the signal I (that is, signal having the same phase as that of the output from the carrier oscillator 84) supplied from the hybrid coupler 89 and the aforementioned signal $R_1$ supplied from the distributor 88 by each other. Similarly, the multiplier 91 multiplies the input signal Q (that is, signal having a phase shifted by 90 degrees from the output of the carrier oscillator 84) and the aforementioned signal $R_2$ by each other. As a result, the multipliers respectively extract a zero-phase component ($I.R_1$) and a 90°-phase component ($Q.R_2$) from the reception signal and send out the two components as detection signals. The signals $I.R_1$ and $Q.R_2$ are supplied, as detection signals, to the low-pass filters 92 and 93, respectively.

The low-pass filters 92 and 93 have an integral function based on band limitation of frequency. By the integral function, the low-pass filters 92 and 93 integrate correlation values of the two signals. That is, when the phase of the aforementioned signal $R_1$ supplied from the multiplier 87 to the multiplier 90 through the distributor 88 is matched with the phase of the aforementioned signal I supplied from the hybrid coupler 89 to the multiplier 90 and when the aforementioned signal $R_2$ supplied to the multiplier 91 in the same manner as described above is matched with the signal Q, the output signals from the multipliers 90 and 91 become pulse signals of a predetermined polarity (pulse signals of a voltage $+E$ or a voltage $-E$) so that large voltage arise in the outputs of the low-pass filters 92 and 93 as a result of integration of the pulse signals, respectively. When the phase of the aforementioned signal $R_1$ is not matched with the phase of the signal I and when the aforementioned signal $R_2$ is not matched with the phase of the signal Q, the output signals from the multipliers 90 and 91 become pulse signals of a randomly changed polarity (that is, pulse signals of a voltage $+E$ and a voltage $-E$) so that a zero voltage arises in the outputs of the low-pass filters 11 and 12 as a result of integration of the signals, respectively.

The zero-phase and 90°-phase components thus subjected to the integral processing through the low-pass filters 92 and 93 are supplied to the squarers 94 and 95, respectively. The squarers 94 and 95 respectively square the amplitudes of the input signals and supply the output signals as operation results to the adder 96. The adder 96 adds the two input signals to each other and supplies a pulse-like detection signal to the propagation-time measurer 97. It is now assumed that the point of time when the detection signal takes its maximum is $t_b$. The aforementioned technique of the steps of; detecting zero-phase and 90°-phase components of transmission carrier respectively from a signal formed by the correlation processing of the reception signal and the signal $B_2$; integrating the detection signals and then squaring the integrated signals, respectively; and adding the pair of squared values to each other to obtain a target detection signal, is more or less complex in configuration but can obtain a high-sensitive target detection signal.

The propagation-time measurer 97 measures the time interval $T_D$ between the point of time $t_a$ when the reference signal supplied from the low-pass filter takes its maximum and the point of time when the detection signal supplied from the adder 96 takes its maximum. Therefore, the propagation-time measurer 97 has a function for detecting the time points when the two input signals respectively take the maximum values. The time T represents a time interval between the time point $t_a$ of generation of the maximum of the reference signal and the time point $T_D$ of generation of the maximum of the detection signal the time $T_D$ can be calculated by increasing the propagation time $\tau$ required for the electromagnetic wave actually reciprocating the distance between the transmission/reception antenna 99/100 and the target by $f_1/(f_1-f_2)$ times. In this embodiment, the following equation is obtained by enlarging the time by 12,500 times, because $f_1 = 100,004$ MHz and $f_2 = 99,996$ MHz. $T_D = 12,500 \tau$.

The time $T_D$ represented by the aforementioned equation is obtained for each period $T_B$ of the reference signal.

Because the measurement time in the present invention is enlarged very greatly, the distance to the target can be measured with high accuracy. Accordingly, it may be said that the measurement apparatus according to the present invention is suitable to a level meter for measuring short distance such as in-furnace slag level, melt level, etc.

Accordingly, the distance x (meter) from the transmission/reception antenna 99/100 to the target is represented by the following formula.

$$\begin{aligned} x &= (f_1 - f_2)/2f_1 \cdot v \cdot T_D \\ &= 1.2 \times 10^4 \cdot T_D \end{aligned}$$

In this embodiment, the receiver 80 used in the distance measuring apparatus receives a reflected signal from the target through the reception antenna 100 and outputs the reception signal after amplifying or attenuating the signal while changing the amplifying or attenuating factor temporarily in synchronism with the synchronizing pulse signal supplied from the pseudo random signal generator 3. The change of the factor with the passage of time is as shown in FIG. 17.

Upon reception of the synchronizing pulse signal from the pseudo random signal generator 3, the receiver 80 increases the attenuation factor for an arbitrary time t after the instance of the input of the pulse, to restrict the inputting of unnecessary reflected signals received for this time to thereby suppress the influence of the unnecessary reflected signals.

Figure 19:
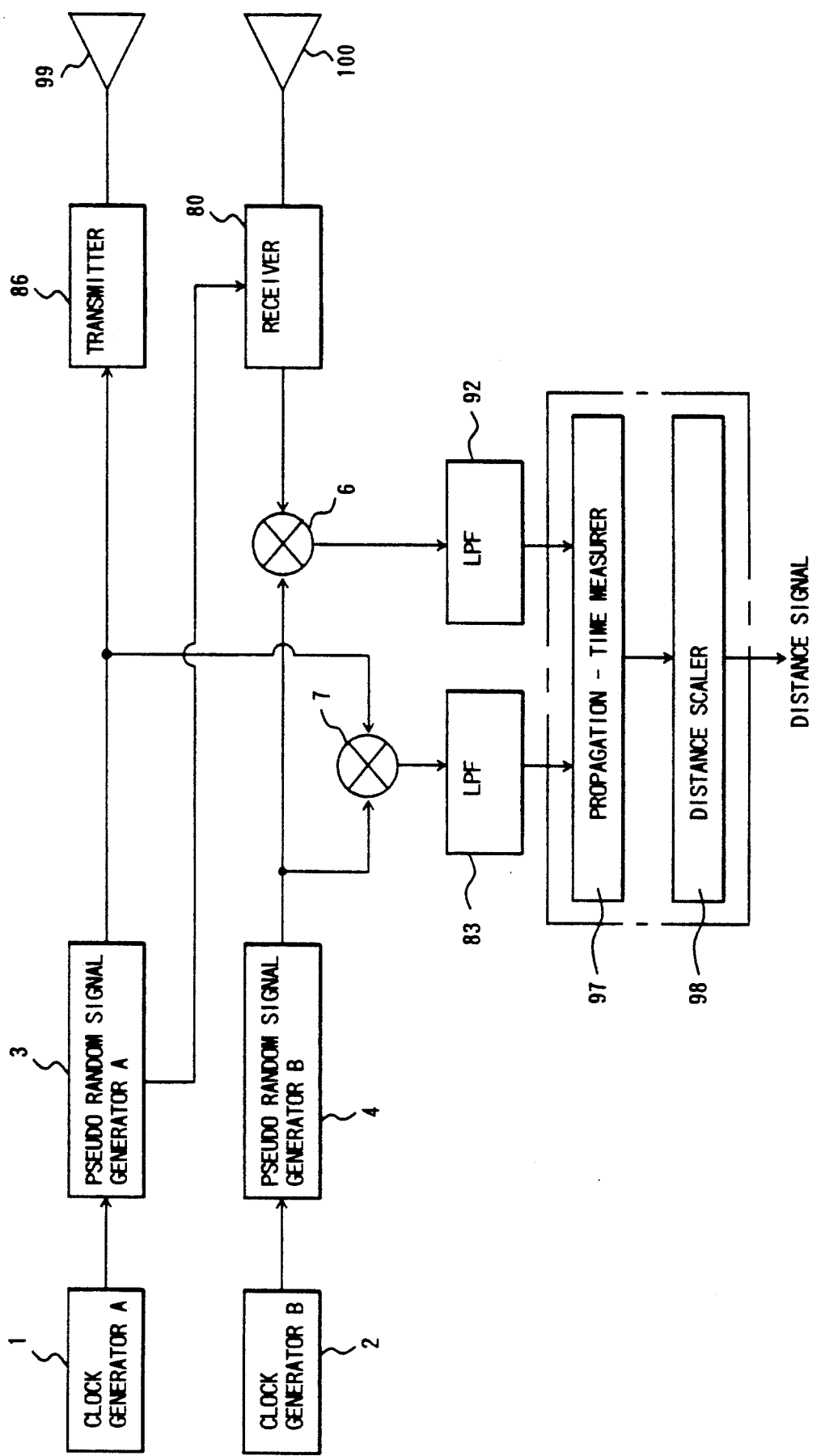
FIG. 19 is a block diagram of a still further embodiment of the distance measuring apparatus according to the present invention.

Referring now to FIG. 19 the 7 pseudo random signal generator as shown in FIG. 13 is used. Further, the pseudo random signal is used as a direct transmission signal.

Also in the embodiment of FIG. 19, each of the two pseudo random signals from generators 3 and 4 are equal in pattern but slightly different in frequency. In this embodiment, the frequencies of the clock signals from clock generators 1 and 2 are selected to be 30,002 MHz and 29,998 MHz, respectively. Each of the pseudo random signal generators 3 and 4 has the structure shown in FIG. 13 and generates a Barker code signal with the code length of 7.

The pseudo random signal from the pseudo random signal generator 3 is supplied to the transmitter 86. The pseudo random signal supplied to the transmitter 86 is power-amplified and converted into an electromagnetic wave therein. Then, the transmitter 86 radiates the electromagnetic wave toward the target through the transmission antenna 99. Therefore, the carrier oscillator 84, the distributor 85 and the multiplier 81 shown in FIG. 18 are omitted in this embodiment of FIG. 19. The electromagnetic wave from the transmission antenna 99 is reflected from the target and converted into an electric signal through the reception antenna 100. The electric signal is supplied to the receiver 80. In respect to the processing after that, a signal formed by multiplying (mixing) the reception signal from the receiver 80 by the pseudo random signal from the pseudo random signal generator 4 by means of the multiplier (Mixer) 6 is supplied to the low-pass filter 92. Accordingly, the distributor 88, the multiplier 91, the low-pass filter 93, the squarers 94 and 95 and the adder 96 shown in FIG. 18 are omitted in this embodiment of FIG. 19.

The output from the low-pass filter 83 and the output from the low-pass filter 92 are supplied to the propagation-time measurer 97 and then processed in the same manner as in the case of FIG. 18, so that the distance from the transmission/reception antenna 99/100 to the target is obtained as an output from the distance scaler 98.

In particular, the distance measuring apparatus in this embodiment can be applied to position measurement of a target buried in the ground or water or can be applied to probing in the ground of the like.

What is claimed is:

1. A distance measuring method comprising the steps of:
   generating first and second pseudo random signals which are equal to each other in wave pattern but different from each other in frequency;
   generating a first time-series pattern obtained by multiplying said first and second pseudo random signals by each other;
   radiating laser light toward a target after intensity-modulating laser light with said first pseudo random signal;
   converting a change in intensity of reflected light into an electric signal after reception of said reflected light as a reception signal from said target;
   generating a second time-series pattern by multiplying said electric signal by said second pseudo random signal; and
   measuring a distance to said target by calculating a time difference between said first and second time-series patterns.

2. A distance measuring apparatus comprising:
   means for generating a first pseudo random signal;
   means for generating a second pseudo random signal which is equal in wave pattern to said first pseudo random signal but slightly different in frequency from said first pseudo random signal;
   a first multiplier for multiplying said first pseudo random signal by said second pseudo random signal to thereby generate a first time-series pattern;
   a laser light generation means for generating laser light intensity-modulated with said first pseudo-random signal;
   a light transmission means for transmitting said laser light to a target;
   a light detector means for receiving reflected light from said target and for converting said reflected light into an electric signal;
   a second multiplier for multiplying said electric signal by said second pseudo random signal to generate a second time-series pattern;
   a time difference measurement means for measuring a time difference between said first time-series pattern and said second time-series pattern; and distance measuring means for measuring a distance to the target in accordance with said time difference.

3. A distance measuring apparatus according to claim 2, in which a semiconductor laser is used as said laser light generation means.

4. A distance measuring apparatus according to claim 2, in which said laser light generation means includes a laser light source, a high frequency generator, and a acoustooptic modulation element supplied with output laser light of said laser light source and driven by an output of said high frequency generator, and in which said light detector means includes a branch means for branching a part of the laser light of said laser light source, a light detector element for combining output light of said branch means and the reflected light from said target to perform heterodyne detection to thereby outputting a result of detection as said electric signal.

5. A distance measuring apparatus according to claim 2, in which said time difference measurement means includes a first low-pass filter supplied with the output of said first multiplier, a second low-pass filter supplied with the output of said second multiplier, and means for measuring a time interval between a point of time when an output signal of said first low-pass filter takes its maximum value and a point of time when an output signal of said second low-pass filter takes its maximum value.

6. A distance measuring apparatus according to claim 2, further comprising a bi-direction measurement means for measuring both a laser light transmission direction and a laser light detection to thereby determine a volumetric shape of said target.

7. A distance measuring apparatus according to claim 2, each of said means for said first and second pseudo random signals including a counter for counting a clock signal and for outputting its count value, a storage device from which stored data is read out in accordance with the count value of said counter as an address for said storage device, and a signal convertor for converting the read-out stored data into a three-values signal, said light detector means being capable of temporarily changing light signal reception sensitivity in synchronism with the period of said pseudo random signal.

* * * * *